(12) United States Patent
De Loynes

(10) Patent No.: US 10,117,547 B2
(45) Date of Patent: Nov. 6, 2018

(54) FLEXIBLE SINK CADDY

(71) Applicant: Umbra LLC, Buffalo, NY (US)

(72) Inventor: Eugenie De Loynes, Toronto (CA)

(73) Assignee: Umbra, LLC, Buffalo, NY (US)

( * ) Notice: Subject to any disclaimer, the term of this patent is extended or adjusted under 35 U.S.C. 154(b) by 29 days.

(21) Appl. No.: 15/286,739

(22) Filed: Oct. 6, 2016

(65) Prior Publication Data
US 2018/0098667 A1    Apr. 12, 2018

(51) Int. Cl.
*A47J 47/20*    (2006.01)
(52) U.S. Cl.
CPC .................................... *A47J 47/20* (2013.01)
(58) Field of Classification Search
USPC ................................ 4/654–659, 292; 383/33
See application file for complete search history.

(56) References Cited

U.S. PATENT DOCUMENTS

| | | | | |
|---|---|---|---|---|
| 5,862,535 A | * | 1/1999 | Noga | E03C 1/264 4/286 |
| 6,418,568 B1 | * | 7/2002 | Briggs | E03C 1/262 4/287 |
| 2009/0025128 A1 | * | 1/2009 | Chong | E03C 1/264 4/292 |
| 2016/0040410 A1 | * | 2/2016 | Carpenter-Crawford | E03C 1/0405 4/652 |

* cited by examiner

*Primary Examiner* — Lauren Crane
(74) *Attorney, Agent, or Firm* — Simpson & Simpson, PLLC

(57) ABSTRACT

A sink accessory, comprising a flexible outer rim including a central area and a flexible webbing connected to the outer rim, the flexible webbing comprising a plurality of holes and an opening, wherein the flexible webbing at least partially occupies the central area of the flexible outer rim.

18 Claims, 4 Drawing Sheets

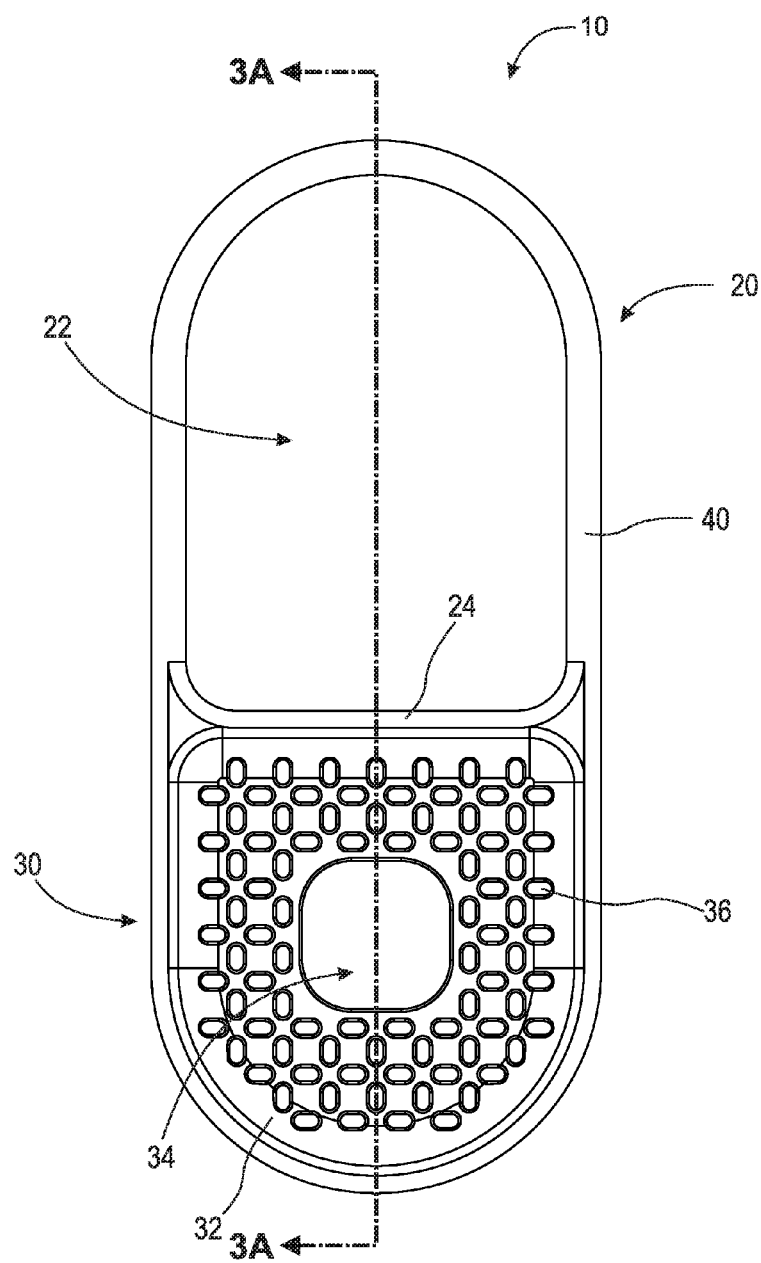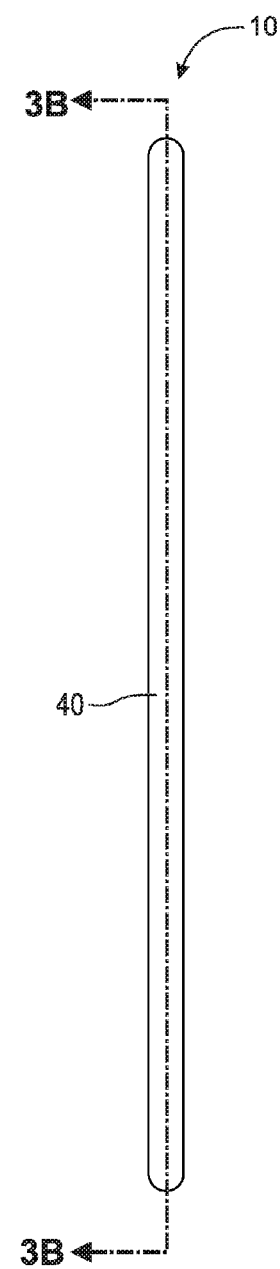
Fig. 2A
Fig. 2B

FLEXIBLE SINK CADDY

FIELD

The disclosure broadly relates to sink accessories, and, more particularly, to a flexible sink caddy.

BACKGROUND

A sink is a basin or receptacle, as in a kitchen or laundry room, usually connected with a water supply and drainage system, for washing dishes, clothing, etc. Materials such as sponges, brushes, and cloths are often used in conjunction with sinks for cleaning purposes. Such cleaning materials get wet in the process and often retain moisture. Finding an area to store wet and/or dirty sponges, brushes, and cloths can be burdensome and, typically, there is no ideal location to store a wet sponge, brush, or cloth between uses. Sinks, especially kitchen sinks, are riddled with germs. Leaving dish washing accessories in a sink or on a countertop after use can be unsanitary or leave a wet mess, which defeats the purpose of cleaning.

There is a long-felt need for a device capable of storing cleaning accessories, such as sponges, brushes, and clothes, near a sink for ease of use, while preventing the accessory from touching surfaces or resting in dirty water.

There is a long-felt need for a device capable of bending and accommodating different types of dish washing accessories.

There is a long-felt need for a dish washing accessory storage device capable of attaching to many different types of surfaces or apparatuses commonly found in kitchens.

SUMMARY

According to aspects illustrated herein, there is provided a sink accessory, comprising a flexible outer rim including a central area and a flexible webbing connected to the outer rim, the flexible webbing comprising a plurality of holes and an opening, wherein the flexible webbing at least partially occupies the central area of the flexible outer rim.

According to aspects illustrated herein, there is provided a method of storing a dish washing accessory, comprising securing a sink accessory proximate a sink, the sink accessory comprising a flexible outer rim portion and a flexible webbing portion connected to the outer rim portion, bending the flexible webbing into a position that optimally stores the dish washing accessory, and placing the specific dish washing accessory within the flexible webbing.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 2A is a front planar view of the flexible sink caddy shown in FIG. 1;

FIG. 2B is a side planar view of the flexible sink caddy shown in FIG. 1;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be appreciated that the term "flexible" can be defined by the following definitions: "capable of being bent without breaking; easily bent," and "susceptible of modification or adaption; adaptable." The flexible sink caddy described herein is capable of being deformed to position and maintaining the deformed position thereafter.

Figure 1:
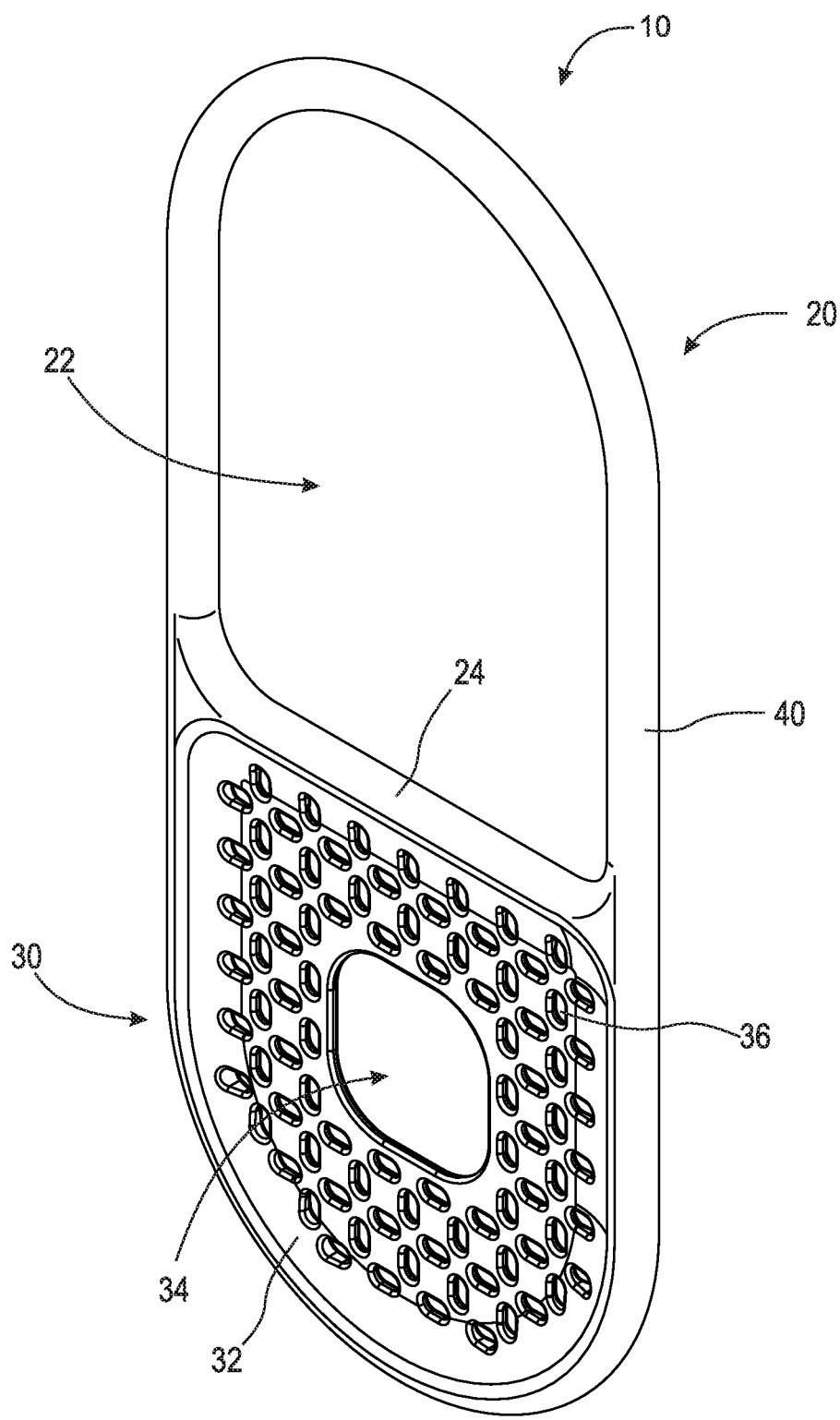
FIG. 1 is a front perspective view of a flexible sink caddy.

Adverting now to the figures, FIG. 1 is a front perspective view of flexible sink caddy 10 in a straight position. Flexible sink caddy 10 generally comprises upper portion 20, lower portion 30, and outer rim 40. Outer rim 40 is generally an edge, margin, or frame added to or around a central object or area. In the straight position, outer rim 40 defines the perimeter of flexible sink caddy 10 and is generally oval in shape. Outer rim 40 comprises a flexible material, for example metal wire, and is capable of being deformed repeatedly. In an example embodiment, outer rim 40 is generally rectangular in the straight position. In an example embodiment, outer rim 40 is generally triangular in the straight position. It should be appreciated, that outer rim 40 can be any shape or design suitable for holding sink accessories.

Upper portion 20 comprises upper opening 22, which is formed by outer rim 40 and threshold 24. Upper opening 22 allows upper portion 20 to be easily bent and shaped for placement around fixtures, such as a faucet or shower head, or for hanging on the edge of a sink.

Lower portion 30 comprises webbing 32, which is surrounded by outer rim 40 and threshold 24. Webbing 32 comprises lower opening 34 and a plurality of holes 36. Lower opening 34 allows accessories with handles to be inserted there through, such that the portion of the accessory that is used for cleaning is cradled by webbing 32. Holes 36 allow moisture to be drained and/or evaporated from the accessory.

FIG. 2A is a front planar view of flexible sink caddy 10. Holes 36 are generally oval shaped through-bores in webbing 32, substantially equal in size, and smaller than lower opening 34. It should be appreciated, however, that holes 36 can be any shape (e.g., rectangular, circular, triangular, etc.) and size suitable to dry a wet accessory. Lower opening 34 is generally rectangular shaped, but it should be appreciated that lower opening 34 can be any shape (e.g., square, circular, triangular, etc.) and size suitable for inserting a kitchenware accessory's handle.

FIG. 2B is a side view of flexible sink caddy 10 in the straight position. Outer rim 40 comprises a uniform thickness and, in the straight position, is generally linear.

Figures 3A, 3B:
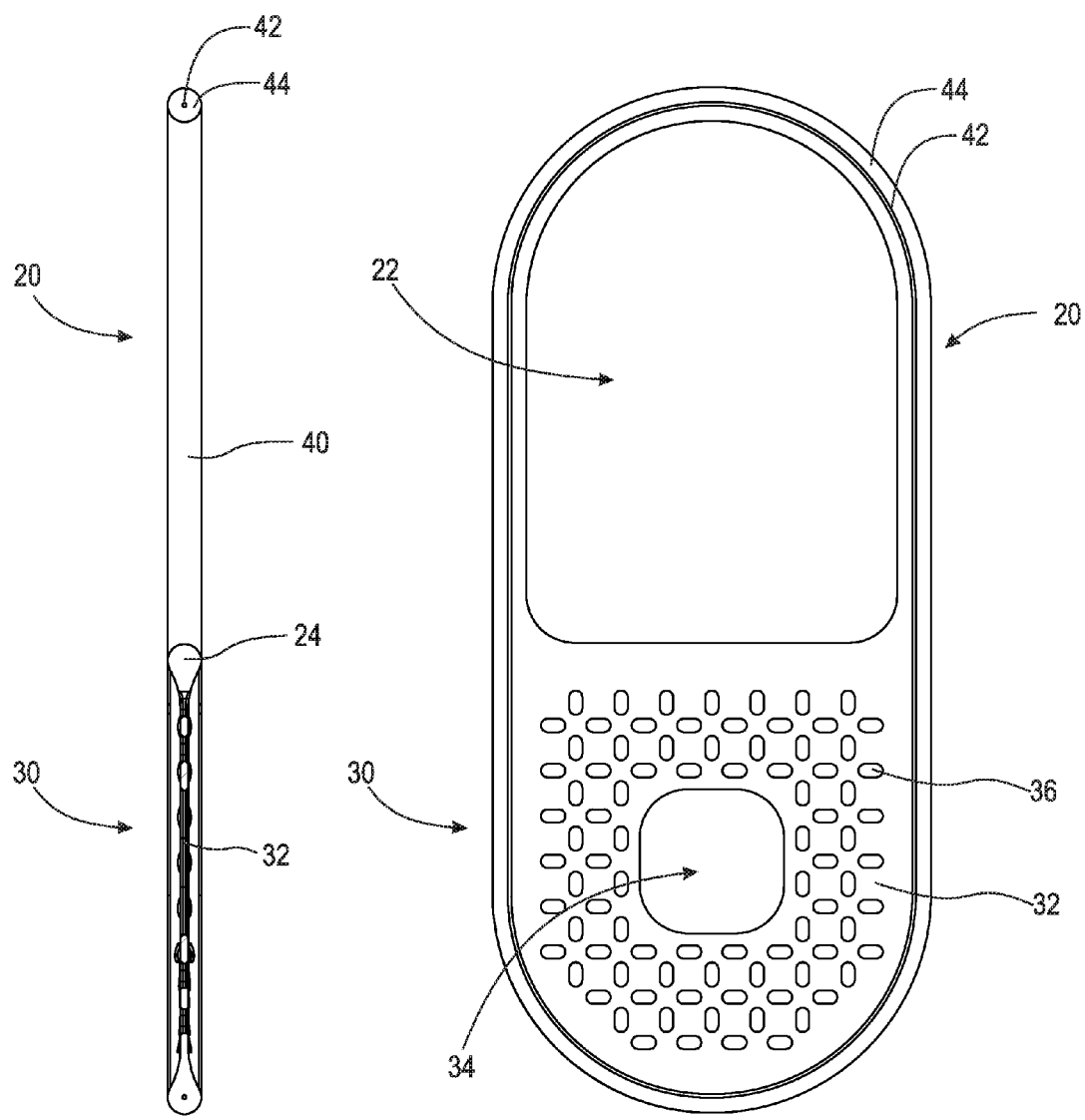
FIG. 3A is a cross-sectional view of the flexible sink caddy shown in FIG. 1, taken generally along line 3A-3A in FIG. 2A.
FIG. 3B is a cross-sectional view of the flexible sink caddy shown in FIG. 1, taken generally along line 3B-3B of FIG. 2B; and, FIG. 4 is a front perspective view of the flexible sink caddy shown in FIG. 1, in a bent position.

FIG. 3A is a cross-sectional view of flexible sink caddy 10, taken generally along line 3A-3A in FIG. 2A. As shown, outer rim 40 comprises wire 42 surrounded by casing 44. Wire 42 is generally located in the center of casing 44 throughout outer rim 40. Wire 42 comprises any material capable of being deformed to a custom shape (e.g., a flexible metal alloy). Webbing 32 has a thickness that is less than the thickness of outer rim 40. In an example embodiment, webbing 32 has a thickness that is greater than or equal to the thickness of outer rim 40. Webbing 32 and casing 44 are made of thermoplastic elastomers. It should be appreciated, however, that webbing 32 and casing 44 can be any suitable material capable of being deformed.

FIG. 3B is a cross-sectional view of flexible sink caddy 10, taken generally along line 3B-3B in FIG. 2B. Wire 42 generally comprises a uniform diameter throughout outer rim 40 and is less than the diameter of casing 44, which completely encloses wire 42.

Figure 4:
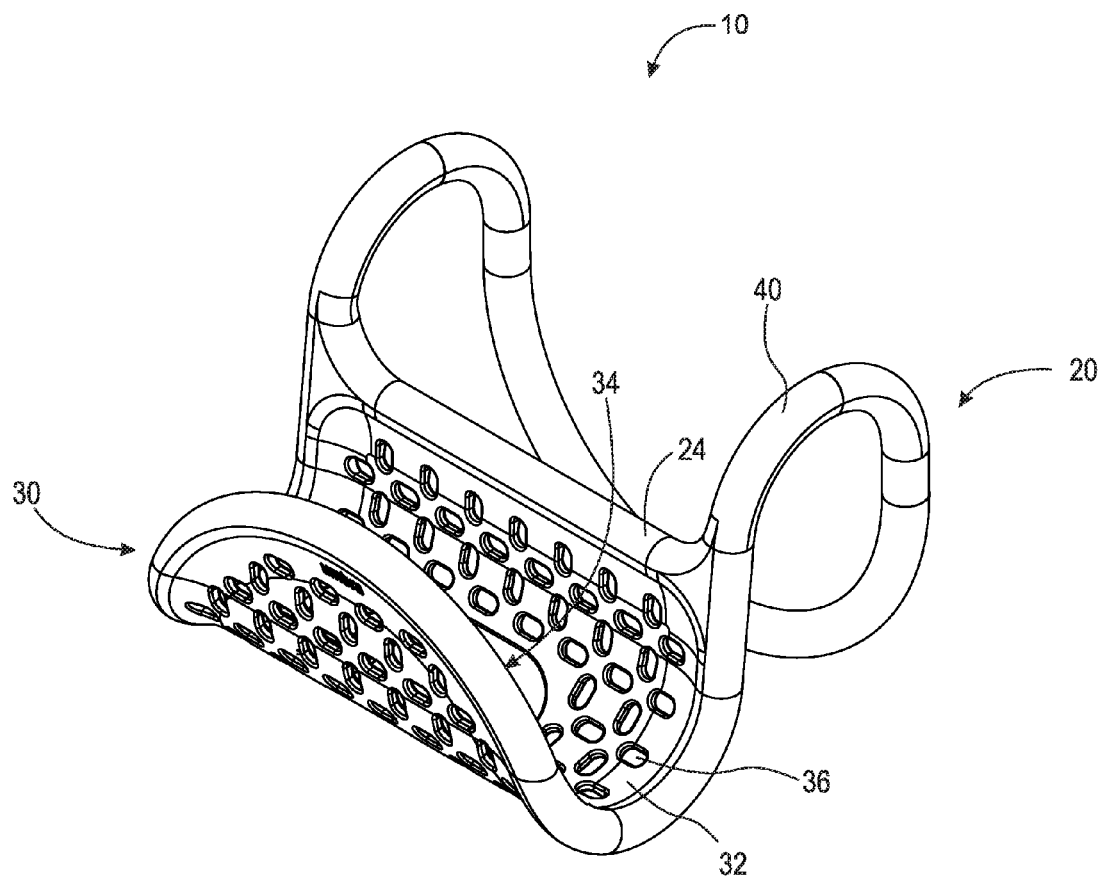

FIG. 4 is a front perspective view of flexible sink caddy 10 in a bent state. Upper portion 20 is deformed to allow flexible sink caddy 10 to be hung, for example around a faucet or on the edge of a sink. Lower portion 30 is deformed to allow cradling and storage of any sink accessories, for example sponges, brushes, wash cloths, etc. Handles of accessories (e.g., scrub brushes) can be inserted through lower opening 34, and the body or head of the accessory rests upon webbing 32. Holes 36 allow moisture to drain from the accessory and also allow air to flow to the accessory.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Flexible sink caddy
20 Upper portion
22 Upper Opening
24 Threshold
30 Lower portion
32 Webbing
34 Lower Opening
36 Holes
40 Outer rim
42 Wire
44 Casing

What is claimed is:

1. A sink accessory, comprising:
    a flexible outer rim including a central area, wherein said flexible outer rim is a continuous cylinder comprising a casing and a metal wire; and,
    a flexible webbing connected to said outer rim, said flexible webbing comprising:
        a plurality of holes; and,
        an opening, wherein said flexible webbing at least partially occupies the central area of said flexible outer rim.

2. The sink accessory as recited in claim 1, wherein each of said plurality of holes has a first diameter and said opening has a second diameter, said first diameter is smaller than said second diameter.

3. The sink accessory as recited in claim 2, wherein said opening is operatively arranged for receiving a handle of a cleaning device.

4. The sink accessory as recited in claim 1, wherein said casing and said flexible webbing comprises a thermoplastic elastomer.

5. The sink accessory as recited in claim 1, wherein said flexible outer rim and said flexible webbing is waterproof.

6. The sink accessory as recited in claim 1, wherein said flexible webbing has a first thickness and said flexible outer rim has a second thickness, said first thickness is less than said second thickness.

7. The sink accessory as recited in claim 1, wherein said flexible webbing has a first thickness and said flexible outer rim has a second thickness, said first thickness is greater than or equal to said second thickness.

8. The sink accessory as recited in claim 1, wherein said flexible outer rim comprises a circular cross-section.

9. The sink accessory as recited in claim 1, wherein said wire is arranged concentrically within said casing.

10. A sink accessory for storing a cleaning device, the sink accessory comprising:
    a flexible outer rim including a central area;
    a threshold separating the central area into an upper portion and a lower portion; and,
    a flexible webbing connected to said outer rim and said threshold, said flexible webbing comprising:
        a plurality of holes; and,
        an opening, wherein said flexible webbing at least partially occupies the lower portion.

11. The sink accessory as recited in claim 10, wherein each of said plurality of holes has a first diameter and said opening has a second diameter, said first diameter is smaller than said second diameter.

12. The sink accessory as recited in claim 11, wherein said opening is operatively arranged for receiving a handle of the cleaning device.

13. The sink accessory as recited in claim 10, wherein said flexible outer rim is a continuous cylinder comprising a casing and a metal wire.

14. The sink accessory as recited in claim 13, wherein said casing and said flexible webbing comprises a thermoplastic elastomer.

15. The sink accessory as recited in claim 10, wherein said flexible outer rim and said flexible webbing is waterproof.

16. The sink accessory as recited in claim 10, wherein said flexible webbing has a first thickness and said flexible outer rim has a second thickness, said first thickness is less than said second thickness.

17. The sink accessory as recited in claim 10, wherein said first thickness is greater than or equal to said second thickness.

18. The sink accessory as recited in claim 10, wherein the upper portion forms an upper opening.

* * * * *